US011500438B2

(12) United States Patent
Ichikawa

(10) Patent No.: US 11,500,438 B2
(45) Date of Patent: Nov. 15, 2022

(54) ELECTRONIC APPARATUS AND METHOD FOR CONTROLLING THE SAME

(71) Applicant: CANON KABUSHIKI KAISHA, Tokyo (JP)

(72) Inventor: Sho Ichikawa, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 16/593,827

(22) Filed: Oct. 4, 2019

(65) Prior Publication Data
US 2020/0117258 A1    Apr. 16, 2020

(30) Foreign Application Priority Data

Oct. 10, 2018   (JP) .............................. JP2018-191738

(51) Int. Cl.
*G06F 1/00* (2006.01)
*G06F 1/26* (2006.01)
*G06F 1/28* (2006.01)
*G06F 13/38* (2006.01)
*H02J 7/00* (2006.01)
(Continued)

(52) U.S. Cl.
CPC .............. *G06F 1/266* (2013.01); *G06F 1/28* (2013.01); *G06F 13/38* (2013.01); *H02J 7/00* (2013.01); *H02J 7/0068* (2013.01); *H02J 7/00718* (2020.01); *H04N 1/00127* (2013.01);
(Continued)

(58) Field of Classification Search
CPC .. G06F 1/266; G06F 1/28; G06F 13/38; H02J 7/00; H02J 7/00718; H02J 7/0068; H02J 7/0047; H02J 7/0048; H04N 5/23241; H04N 5/772; H04N 1/00127;
(Continued)

(56) References Cited

U.S. PATENT DOCUMENTS 9,635,478 B1 *   4/2017   Mazanec ............... H04R 25/305
2009/0195212 A1 *   8/2009   Chiasson ............. G01R 31/392
320/136

(Continued)

FOREIGN PATENT DOCUMENTS

JP    2007-312216 A    11/2007
JP    2008-97458 A    4/2008
(Continued)

*Primary Examiner* — Xuxing Chen
(74) *Attorney, Agent, or Firm* — Canon U.S.A., Inc. I.P. Division

(57) ABSTRACT

An electronic apparatus including a Universal Serial Bus (USB) Type-C™ connector includes a connection detection unit configured to detect a connection of a power source connected to the electronic apparatus via the USB Type-C connector, a power supply control unit configured to receive a supply of power from the connected power source, a communication control unit configured to communicate with the power source via a Configuration Channel (CC) terminal, an information acquisition unit configured to acquire a remaining capacity of the power source using the communication control unit every predetermined time, and a control unit configured to, in a case where a difference between a first remaining capacity acquired by the information acquisition unit and a second remaining capacity acquired after the first remaining capacity is acquired is greater than or equal to a predetermined amount, give a user notification.

13 Claims, 14 Drawing Sheets

(51) Int. Cl.
*H04N 5/232* (2006.01)
*H04N 5/77* (2006.01)
*H04N 1/00* (2006.01)

(52) U.S. Cl.
CPC ......... *H04N 5/23241* (2013.01); *H04N 5/772* (2013.01); *H04N 2201/0084* (2013.01)

(58) Field of Classification Search
CPC ....... H04N 2201/0084; H04N 5/23209; H04N 5/232939; H04N 5/232941; Y02D 10/00
See application file for complete search history.

(56) References Cited

U.S. PATENT DOCUMENTS

| | | | |
|---|---|---|---|
| 2010/0262392 A1* | 10/2010 | Murphy | G06F 3/0625 |
| | | | 702/63 |
| 2010/0277326 A1* | 11/2010 | Berk | G06F 11/3058 |
| | | | 340/636.11 |
| 2015/0244185 A1* | 8/2015 | Won | G06F 1/266 |
| | | | 320/103 |
| 2017/0185134 A1* | 6/2017 | Han | G06F 1/3296 |
| 2018/0081417 A1* | 3/2018 | Chan | G06F 1/329 |

FOREIGN PATENT DOCUMENTS

| | | |
|---|---|---|
| JP | 2013-134683 A | 7/2013 |
| JP | 2018-7451 A | 1/2018 |
| WO | 2016/067735 A1 | 5/2016 |

\* cited by examiner

FIG.3

| OPERATION | POWER CONSUMPTION |
|---|---|
| CAPTURING OF MOVING IMAGE (4K 30p) | 5000 [mW] |
| CAPTURING OF MOVING IMAGE (FHD 60p) | 4000 [mW] |
| CAPTURING OF SINGLE STILL IMAGE (BACK SIDE MONITOR IS USED) | 30 [mW] |
| CAPTURING OF SINGLE STILL IMAGE (VIEWFINDER IS USED) | 10 [mW] |
| WAITING (IMAGE CAPTURING SCREEN IS DISPLAYED) | 2500 [mW] |
| WAITING (DISPLAY IS OFF) | 0.001 [mW] |

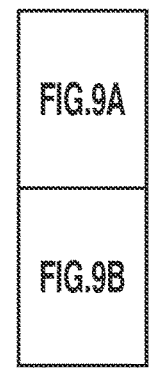
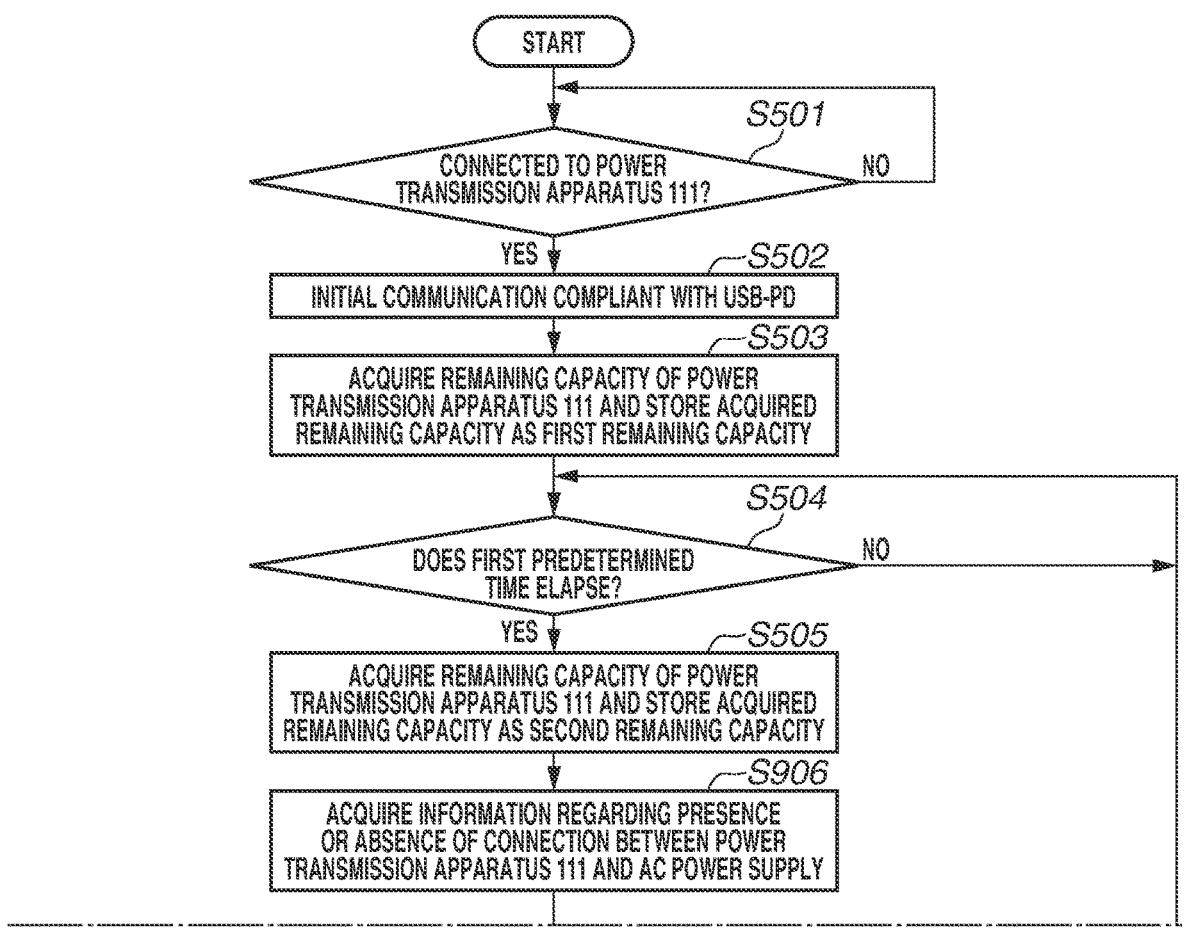

ELECTRONIC APPARATUS AND METHOD FOR CONTROLLING THE SAME

BACKGROUND

Field of the Disclosure

The present invention generally relates to an electronic apparatus and a method for controlling the same, and in particular, relates to an electronic apparatus capable of operating with power from an external power supply apparatus.

DESCRIPTION OF THE RELATED ART

Conventionally, there is a technique in which through a wired communication interface for connecting to an electronic apparatus such as a camera, power can be transmitted in parallel with data transfer. Typical examples of the technique include Universal Serial Bus (USB) (registered trademark).

In devices compatible with the Universal Serial Bus Power Delivery (USB-PD) standard, a power transmission apparatus such as a USB host device or an alternating current (AC) adapter can supply a maximum power of 100 W to a power reception apparatus that connects to the power transmission apparatus via a USB cable and receives power from the power transmission apparatus. Further, the emergence of the USB Type-C (registered trademark) standard enables the supply of large power using the USB-PD standard through a small-sized USB connector. This increases the number of devices capable of being driven by the supply of power from a USB interface. Thus, the supply of power based on USB is increasingly prevalent.

Based on the USB-PD standard, if a power transmission apparatus and a power reception apparatus compatible with the USB-PD standard connect to each other, the apparatuses perform negotiation communication and exchange power information with each other. This enables the power transmission apparatus to supply power requested by the power reception apparatus. Further, in the negotiation communication, information other than the power information, such as information regarding the remaining capacity of the power transmission apparatus and authentication information regarding a cable can be exchanged.

In recent years, due to the influence of an increase in devices compatible with the supply of power based on USB, such as cameras and smartphones, power transmission apparatuses including a plurality of USB connection ports increase. One of the power transmission apparatuses is a power source (e.g., a mobile battery) having a finite capacity. For example, in a case where a plurality of power reception apparatuses is simultaneously connected to such a battery, the remaining capacity of the mobile battery is consumed faster than in a case where only a single power reception apparatus is connected to the mobile battery. At this time, if each power reception apparatus notifies a user of an operation, taking into account only the power consumption of the power reception apparatus itself with respect to the remaining capacity of the mobile battery, a discrepancy from the actual consumption may occur, and the user may feel that the mobile battery drains faster. Further, there is an issue that in the worst case, an operation stops against the user's intention.

In response to the above issue, for example, in Japanese Patent Application Laid-Open No. 2008-97458, when an event where power consumption is large occurs in a battery-driven device, the voltage, the current, and the remaining capacity of a battery within the device are detected in a shorter period than normal. Then, based on the detection result, a battery usable time is calculated, and display is updated in a timely manner. In Japanese Patent Application Laid-Open No. 2013-134683, in a case where a portable device capable of supplying power to an external device supplies power to a plurality of devices, the portable device limits the number of devices allowed to draw a predetermined current or more, thereby controlling power to be supplied to an external device within the ability of the portable device.

The conventional art discussed in Japanese Patent Application Laid-Open No. 2008-97458, however, is premised on a battery within a device capable of detecting the voltage, the current, and the remaining capacity of the battery. Japanese Patent Application Laid-Open No. 2008-97458 does not discuss control when the device connects to an external power supply. Japanese Patent Application Laid-Open No. 2013-134683 discusses a technique in which a device capable of supplying power to an external device based on USB controls power to be supplied within the ability of the device. Japanese Patent Application Laid-Open No. 2013-134683, however, does not discuss control according to power that can be supplied by a power reception device on the power reception side.

SUMMARY OF THE INVENTION

The present disclosure is directed to providing a method for, when an electronic apparatus operates using an external power supply such as a mobile battery, giving a user notification based on the actual power consumption of the electronic apparatus.

According to an aspect of the present disclosure, an electronic apparatus includes a power reception unit configured to receive supply of power from an external power source, a communication unit configured to receive information regarding a remaining capacity of the external power source from the external power source, an acquisition unit configured to acquire, from the information received by the communication unit, an amount of change in the remaining capacity of the external power source in a predetermined period, and a notification unit configured to, in a case where the amount of change in the remaining capacity of the power source is greater than a first threshold based on a power consumption amount of the electronic apparatus in the predetermined period, give a notification to a user.

Further features of the present disclosure will become apparent from the following description of exemplary embodiments with reference to the attached drawings.

BRIEF DESCRIPTION OF THE DRAWINGS

FIG. 3 is a table illustrating an example of power consumption of each operation of the imaging apparatus.

FIGS. 9A and 9B are a flowchart of a user notification based on information regarding an external power supply, according to the third exemplary embodiment.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Exemplary embodiments of the present disclosure will be described in detail below based on the attached drawings. A description will be given below using as an example of an electronic apparatus a digital camera that is an imaging apparatus. The electronic apparatus, however, is not limited to this, and can be applied to a device capable of operating by receiving power from an external power source.

Figure 1:
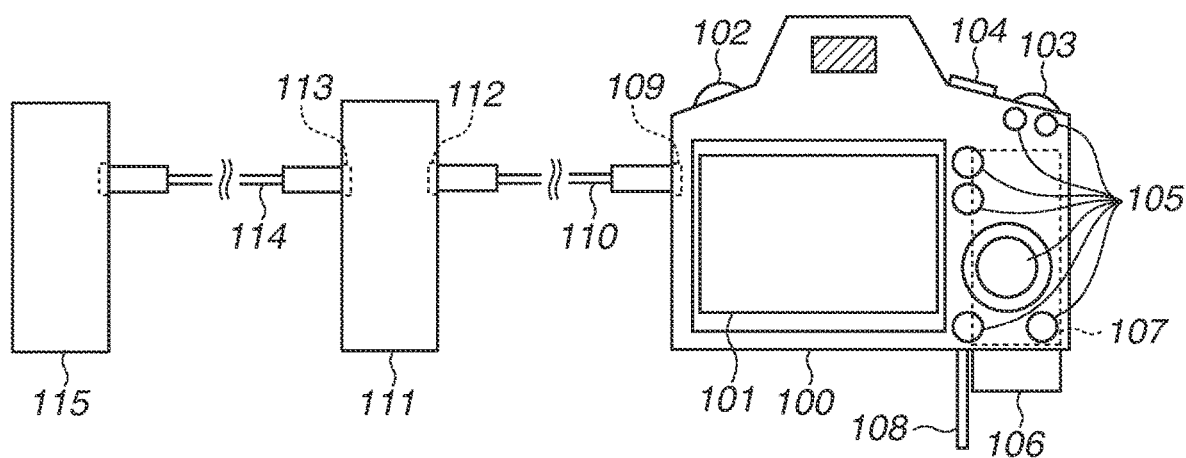
FIG. 1 is an external view illustrating an example of an imaging apparatus and an external power supply connected to the imaging apparatus.

FIG. 1 is an external view illustrating an example of a digital camera as an example of an imaging apparatus 100 and an external power supply connected to the imaging apparatus 100. The imaging apparatus 100 illustrated in FIG. 1 is configured to operate by receiving power from a power transmission apparatus 111 electrically connected to the imaging apparatus 100 via a connector 109, a cable 110, and a connector 112. Further, the imaging apparatus 100 may be configured to charge a battery 106 within the imaging apparatus 100. Furthermore, in the example of FIG. 1, the power transmission apparatus 111 (a power source) is configured to also supply power to another power reception apparatus 115 (an electronic apparatus) via a connector 113 and a cable 114.

In the imaging apparatus 100, a display unit 101 is a display unit such as a liquid crystal panel that displays an image and various pieces of information. A power switch 102 is an operation member for switching the operating state of the imaging apparatus 100. A release switch 103 is an operation member for giving an instruction regarding the capturing of an image. A mode dial 104 is an operation member for switching various modes. An operation unit 105 is composed of operation members such as various switches and buttons other than the above operation members and receives various operations from a user for changing various settings of the imaging apparatus 100 and instructing the imaging apparatus 100 to operate. The operation members of the operation unit 105 are appropriately assigned functions for corresponding scenes by performing the operation of selecting various function icons displayed on the display unit 101 and can act as various function buttons. The function buttons include, for example, an end button, a return button, an image forward button, a jump button, a narrowing-down button, an attribute change button, and a reproduction button. For example, if a menu button is pressed, a menu screen where various settings can be made is displayed on the display unit 101. The user can make various settings using the menu screen displayed on the display unit 101, a four-directional button for up, down, left, and right directions, and a set button. Further, according to the pressing of the reproduction button, the operation mode of the imaging apparatus 100 can be switched to a reproduction mode.

The battery 106 is a secondary battery and supplies power to the imaging apparatus 100 via a power supply control unit 214 by discharge, thereby driving the imaging apparatus 100. Furthermore, the battery 106 can be charged with power supplied by the power transmission apparatus 111, via the connector 112, the cable 110, the connector 109, and a power reception unit 211. A battery slot 107 is a slot for storing the battery 106 and is closed by a cover 108.

The connector 109 is a connector for connecting the imaging apparatus 100 to an external device. In the present exemplary embodiments, the connector 109 is, for example, a connector compliant with the Universal Serial Bus (USB) Type-C (registered trademark) standard. In this case, the connector 109 includes terminals such as a VBUS terminal for receiving the supply of power, Configuration Channel (CC) terminals (a CC1 terminal and a CC2 terminal) used to detect a connection between devices and used for communication, a (Data+) D+ terminal and a (Data−) D− terminal used for USB 2.0 communication, and a ground (GND) terminal.

The cable 110 is a cable for connecting the connectors 109 and 112. In the present exemplary embodiments, the cable 110 is a USB cable compliant with the USB Type-C standard. Alternatively, a configuration may be employed in which the connector 112 of the power transmission apparatus 111 can directly connect to the connector 109 of the electronic apparatus 100 without using the cable 110.

The power transmission apparatus 111 is a device having a source ability to supply power via the cable 110 and is, for example, a personal computer (PC) or a mobile battery. The power transmission apparatus 111 connects to the imaging apparatus 100 via the connector 109, the cable 110, and the connector 112 and thereby can supply power to the power reception unit 211. Further, the power transmission apparatus 111 can also connect to the another power reception apparatus 115 (an electronic apparatus) via the connector 113 and the cable 114 and supply power to the another power reception apparatus 115.

The connector 112 is a first connector for connecting the power transmission apparatus 111 to an external device and is a connector capable of connecting to the imaging apparatus 100. For example, in a case where the connector 112 is a connector compliant with the USB Type-C standard according to the present exemplary embodiments, the connector 112 includes terminals such as a VBUS terminal for supplying power, CC terminals (a CC1 terminal and a CC2 terminal) used to detect a connection between devices and used for communication, a D+ terminal and a D− terminal used for USB 2.0 communication, and a GND terminal.

The connector 113 is a second connector for connecting the power transmission apparatus 111 to another electronic apparatus. The cable 114 is a cable for connecting the connector 113 to the another power reception apparatus 115. In the present exemplary embodiments, similarly to the connector 112, the connector 113 is configured to be compliant with the USB Type-C standard, and the cable 114 is a USB cable compliant with the USB Type-C standard. A configuration may be employed in which the connector 113 and the cable 114 connect the power transmission apparatus 111 and the another power reception apparatus 115 via a connection interface different from the connector 109.

The power reception apparatus 115 is an electronic apparatus different from the imaging apparatus 100 connected to the power transmission apparatus 111 and is, for example, a smartphone or a tablet computer.

Figure 2:
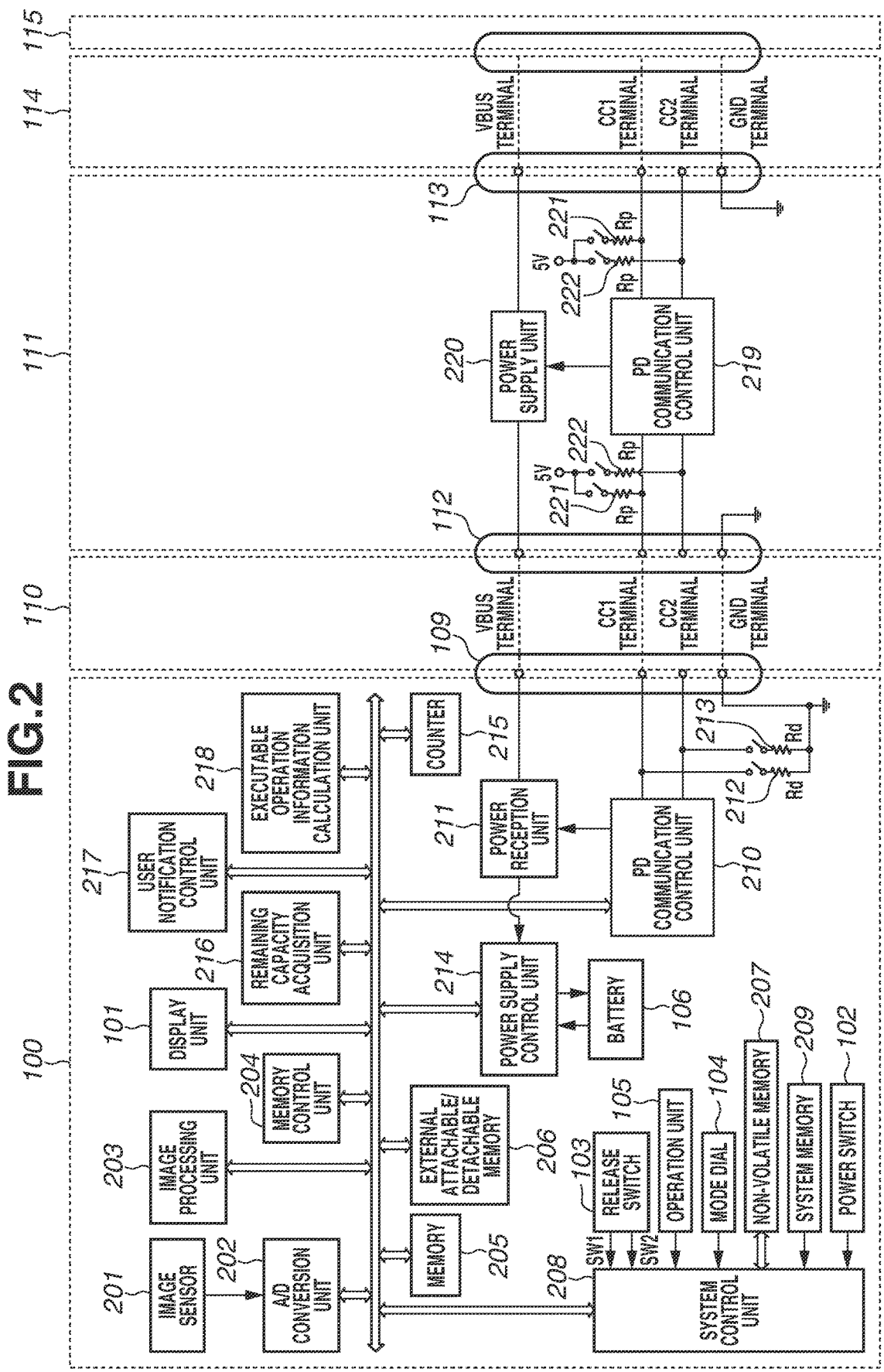
FIG. 2 is a block diagram illustrating an example of configurations of the imaging apparatus and the external power supply connected to the imaging apparatus.

FIG. 2 is a block diagram illustrating an example of a configuration including the imaging apparatus 100 and the power transmission apparatus 111 as the external power supply connected to the imaging apparatus 100. Components similar to those in FIG. 1 are designated by the same signs, and are not described here. The imaging apparatus 100 illustrated in FIG. 2 is connected to the power transmission apparatus 111 via the cable 110. The power transmission apparatus 111 is connected to the another power reception apparatus 115 (an electronic apparatus) via the cable 114. CC signal lines of the cables 110 and 114 are connected to the CC1 terminals of the connectors 109, 112, and 113, and VBUS signal lines of the cables 110 and 114 for exchanging power are connected to the VBUS terminals of the connectors 109, 112, and 113. Each connector includes two CC terminals in compliance with USB Type-C. Depending on the direction (front or back) in which a cable is inserted, the CC signal line of the cable connects to either a CC1 terminal or a CC2 terminal.

The imaging apparatus 100 images an object and generates image data. The functional blocks of the imaging apparatus 100 are connected together so that the functional blocks can exchange a data signal to each other via a bus.

An image sensor 201 is a charge-coupled device (CCD) or a complementary metal-oxide-semiconductor (CMOS) device that converts an optical image into an electric signal. The release switch 103 is pressed, whereby the image sensor 201 forms an optical image of an object through an optical system such as a lens (not illustrated) and converts optical information regarding the optical image into an electric signal. The image sensor 201 combines the optical image with a color filter, thereby acquiring color information. Then, the image sensor 201 outputs the formed object image as an electric signal (an analog signal).

An analog-to-digital (A/D) conversion unit 202 converts an analog signal output from the image sensor 201 into a digital signal. The converted digital signal (image signal) is sent to an image processing unit 203.

The image processing unit 203 performs a resizing process such as pixel interpolation and reduction, a color conversion process, a filter process, and image processing such as noise removal on a digital signal (data) received from the A/D conversion unit 202 or a memory control unit 204 to generates an image. Further, the image processing unit 203 performs a predetermined calculation process using a captured image signal. Then, a system control unit 208 performs exposure control and distance measurement control based on the obtained calculation result. In this manner, an autofocus (AF) process, an automatic exposure (AE) process, and a pre-flash (EF) process are performed by a through-the-lens (TTL) method. Further, the image processing unit 203 performs a predetermined calculation process using a captured image signal and also performs an auto white balance (AWB) process by the TTL method based on the obtained calculation result.

The memory control unit 204 controls the transmission and reception of a data signal via the bus between the A/D conversion unit 202, the image processing unit 203, the display unit 101, a memory 205, and an external attachable/detachable memory 206.

The memory 205 stores image data obtained by the image sensor 201 and converted into digital data by the A/D conversion unit 202 and image data to be displayed on the display unit 101. The memory 205 has a sufficient storage capacity for storing a predetermined number of still images and a moving image and a sound of a predetermined length of time. Furthermore, the memory 205 can store the history of the power consumption of each operation of the imaging apparatus 100 and an operation executed by the imaging apparatus 100.

The external attachable/detachable memory 206 is a recording medium such as a memory card for recording a captured image and is composed of a semiconductor memory or a magnetic disk.

A non-volatile memory 207 is an electrically erasable and recordable memory and is, for example, an electrically erasable programmable read-only memory (EEPROM). The non-volatile memory 207 stores a constant for the operation of the system control unit 208 and a program. The "program" includes a program for executing various flow charts described below in the present exemplary embodiments.

The system control unit 208 controls the entirety of the imaging apparatus 100 and controls the capturing of an image, image processing, and the output of a video. The system control unit 208 executes a program recorded in the non-volatile memory 207, thereby achieving processes described below in the present exemplary embodiments. Further, the system control unit 208 controls the memory 205 and the display unit 101, thereby also performing display control.

In response to the fact that the user operates the mode dial 104, the release switch 103, and the operation unit 105, the system control unit 208 receives various operation instructions. The mode dial 104 enables the switching of the operation mode such as a still image recording mode or a moving image recording mode. The still image recording mode includes modes such as an auto image capturing mode, an auto scene distinction mode, a manual mode, various scene modes in which image capturing settings are made according to image capturing scenes, a program AE mode, and a custom mode. According to an operation on the mode dial 104, the operation mode is directly switched to any one of these modes included in the still image capturing mode. Alternatively, the operation mode may be temporarily switched to the still image capturing mode using the mode dial 104, and then, the still image capturing mode may be switched to any one of these modes included in the still image capturing mode, using another operation member. Similarly, the moving image capturing mode may also include a plurality of modes. In an intermediate state of an operation, i.e., by a so-called half press, on the release switch 103, the release switch 103 generates a first release switch signal SW1 (an image capturing preparation instruction). Based on the first release switch signal SW1, an operation such as an AF process, an AE process, an AWB process, or an EF process is started. By the completion of an operation, i.e., by a so-called full press, on the release switch 103, the release switch 103 generates a second release switch signal SW2 (an image capturing execution instruction). In response to the second release switch signal SW2, the system control unit 208 executes a series of operations of an image capturing process from the reading of a signal from the image sensor 201 to the writing of image data to the external attachable/detachable memory 206.

As a system memory 209, a random-access memory (RAM) is used. A constant or a variable for the operation of the system control unit 208 and a program read from the non-volatile memory 207 are loaded into the system memory 209.

A Power Delivery (PD) communication control unit 210 detects a connection of an external device using the CC1 and CC2 terminals and controls communication with the external device based on the Universal Serial Bus Power Delivery (USB-PD) standard. USB-PD is one of power supply standards compatible with a terminal compliant with the USB Type-C standard and enables the supply of a maximum power of 100 W (20 V/5 A). Devices connected together negotiate with each other through communication via USB interfaces and thereby can exchange desired power.

A power reception unit 211 supplies power received from the VBUS terminal so that the power can be used in the imaging apparatus 100. Based on the USB-PD standard, the power reception side (the imaging apparatus 100) can receive the supply of power in the voltage range from 5 V to 20 V. Thus, the power reception unit 211 needs to be able to operate in a wide voltage range.

A resistor 212 is a first pull-down resistor (Rd) and is a resistance element capable of pulling down the CC1 terminal to GND with a predetermined resistance value. A resistor 213 is a second pull-down resistor (Rd) and is, similarly to the resistor 212, a resistance element capable of pulling down the CC2 terminal to GND with the predetermined resistance value. The resistors 212 and 213 are used to detect a device connected to the imaging apparatus 100. For example, according to the USB Type-C standard, the resistors 212 and 213 pull down the CC1 and CC2 terminals to GND with 5.1 kΩ, thereby causing the power transmission apparatus 111 to recognize a connection of the imaging apparatus 100.

A power supply control unit 214 converts power received by the power reception unit 211 or power from the battery 106 into a voltage that can be used by the imaging apparatus 100 and supplies the power. For example, the power supply control unit 214 is composed of a direct-current-to-direct-current (DC/DC) converter and configured to supply power required by the system control unit 208 and peripheral circuits such as the functional blocks within the imaging apparatus 100. Further, the power supply control unit 214 can switch the supply of power to the system control unit 208 or the peripheral circuit among from the power reception unit 211, from the battery 106, and from both the power reception unit 211 and the battery 106. Furthermore, the power supply control unit 214 can charge the secondary battery (the battery 106) using power from the power reception unit 211.

A counter 215 measures the lapse of time.

A remaining capacity acquisition unit 216 acquires information regarding the remaining capacity of a battery (not illustrated) of the power transmission apparatus 111. For example, the remaining capacity information can be acquired through PD communication by the PD communication control unit 210.

A user notification control unit 217 gives a notification through the display unit 101 by displaying information or displaying a warning so that the user can recognize the information or the warning. For example, based on the acquisition result of the remaining capacity acquisition unit 216, the user notification control unit 217 displays an icon, text, and a numerical value on the display unit 101. The notification is not limited to the display through the display unit 101. A configuration may be employed in which the notification is given using a sound.

Based on the remaining capacity of the battery 106 and the remaining capacity of the battery of the power transmission apparatus 111 acquired by the remaining capacity acquisition unit 216, an operation information calculation unit 218 calculates information regarding an operation executable by the imaging apparatus 100. The information regarding an executable operation may be calculated only from the remaining capacity of the battery 106, or may be calculated only from the remaining capacity of the battery (not illustrated) of the power transmission apparatus 111. The information regarding an executable operation includes, for example, the number of still images to be captured and the capturing time of a moving image, and may include information other than these pieces of information.

The power transmission apparatus 111 is an apparatus capable of, based on the USB-PD standard, supplying power to an external apparatus. The power transmission apparatus 111 is a power source, such as a mobile battery, that has a finite power capacity and includes a PD communication control unit 219 and a power supply unit 220.

The PD communication control unit 219 detects a connection of an external device using the CC1 and CC2 terminals and controls communication with the external device based on the USB-PD standard.

The power supply unit 220 is a power supply unit capable of outputting power to be supplied to the VBUS terminals and power required for the operation of the PD communication control unit 219. The power supply unit 220 is configured to convert alternating-current power obtained from a commercial power supply (not illustrated) or battery power and output a direct-current constant voltage having a predetermined voltage value. For example, the power supply unit 220 can output a power of 5 V to be supplied to each VBUS terminal. Further, the power supply unit 220 is configured to, based on an instruction from the PD communication control unit 219, start or stop the output of a power of 5 V to be supplied to each VBUS terminal. The power supply unit 220 can supply power to the PD communication control unit 219 and a peripheral circuit that can be controlled by the PD communication control unit 219, regardless of the states of the supply of power to the VBUS terminals.

A resistor 221 is a first pull-up resistor (Rp) and is a variable resistance element capable of pulling up the CC1 terminal to a predetermined power supply with a predetermined resistance value. A resistor 222 is a second pull-up resistor (Rp) and is, similarly to the resistor 221, a variable resistance element capable of pulling up the CC2 terminal to a predetermined power supply with a predetermined resistance value. The predetermined resistance values of the resistors 221 and 222 may only need to be resistance values compliant with the USB Type-C standard, and are 10 kΩ, for example. The resistors 221 and 222 are each also used to detect a connection of a device and present power that can be supplied to a power reception apparatus connected to the power transmission apparatus 111. The resistors 221 and 222 can pull up the CC1 terminal and the CC2 terminal to predetermined power supplies, regardless of the output state of the VBUS terminal. The predetermined power supply is, for example, a constant voltage source of 5 V. For example, according to the USB Type-C standard, the resistors 221 and 222 pull up the CC1 terminal and the CC2 terminal to a power supply of 5 V with 10 kΩ and thereby can indicate that 5 V and 3 A can be supplied to the power reception apparatus. Further, the PD communication control unit 219 monitors the voltage of each of the CC1 and CC2 terminals, thereby detecting that a power reception apparatus to which power should be supplied is connected to the power transmission apparatus 111. The CC1 and CC2 terminals of the power reception apparatus (e.g., the imaging apparatus 100) connected to the power transmission apparatus 111 are pulled down to GND by the pull-down resistors Rd with 5.1 kΩ. The power reception apparatus (e.g., the imaging apparatus 100), which does not supply power to an external apparatus, does not need to present power that can be supplied by the power reception apparatus, and the value of each pull-down resistor Rd is uniquely determined. As an example, if the resistors 221 and 222 pull up the CC1 and CC2 terminals to a power supply of 5 V with 10 kΩ, a voltage of 1.69 V obtained by division is applied to the PD communication control unit 219. According to the USB Type-C standard, a power transmission apparatus capable of supplying 5 V and 3 A detects a connection of a power reception apparatus due to the fact that the terminal voltage of either one of CC1 and CC2 terminals falls within the range from 0.85 V to 2.45 V. Then, the power transmission apparatus instructs the power supply unit 220 to start output to the VBUS terminal. In the power transmission apparatus 111 according to the present exemplary embodiments, the resistors 221 and 222 are configured for each of a plurality of connectors (the connectors 112 and 113).

FIG. 3 is a table illustrating an example of the power consumption of each operation of the imaging apparatus 100. A table 301 specifically illustrates the power consumption of each operation of the imaging apparatus 100 such that the operation is in the left column, and the corresponding power consumption is in the right column. For example, if the operation is the capturing of a moving image (4K 30 p), the power consumption is 5000 mW. If the operation is the capturing of a moving image (full high definition (FHD) 60 p), the power consumption is 4000 mW. If the operation is the capturing of a single still image (a back side monitor is used), the power consumption is 30 mW. If the operation is the capturing of a single still image (a viewfinder is used), the power consumption is 10 mW. If the operation is waiting (an image capturing screen is displayed), the power consumption is 0.5 mW. If the operation is waiting (display is off), the power consumption is 0.001 mW. Although six types of operations are exemplified as the operations included in the table 301, a more detailed table including other operations may be used. For example, power consumption $P_{total}$ [W] in a first predetermined time $t_{total}$ [h] is calculated based on power consumption $P_i$ [W] and an execution time $t_i$ [h] of an operation i by the following formula (1).

$$P_{total} = \frac{1}{t_{total}} \sum_{i=1}^{n} P_i t_i (i = 1, 2, \ldots, n) \quad \text{formula (1)}$$

Further, a power consumption amount $Ph_{total}$ [Wh] in the first predetermined time $t_{total}$ [h] is calculated by formula (2).

$$Ph_{total} = P_{total} \times t_{total} \quad \text{formula (2)}$$

With reference to FIGS. 4A, 4B, 4C, and 5, a description will be given below of an example where based on a change in the remaining capacity of the external power supply, it is determined whether another power reception apparatus is connected, and the user is notified of the determination result, according to a first exemplary embodiment.

Figure 4A:
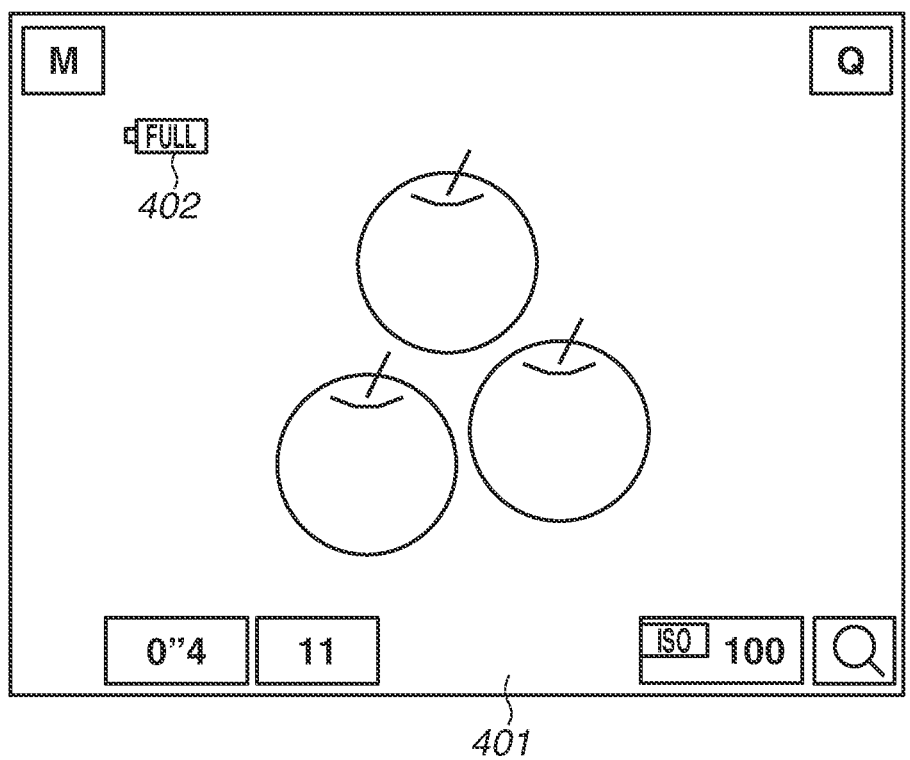
FIGS. 4A, 4B, and 4C are examples of display of a user notification according to a first exemplary embodiment.
Figure 4B:
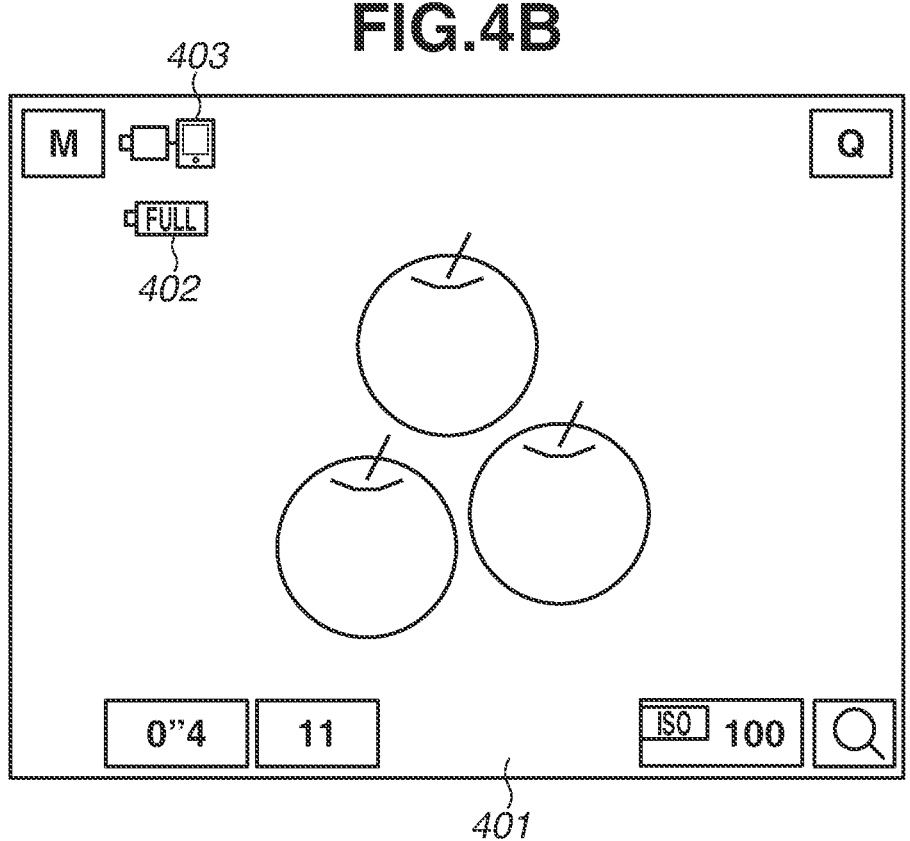
Figure 4C:
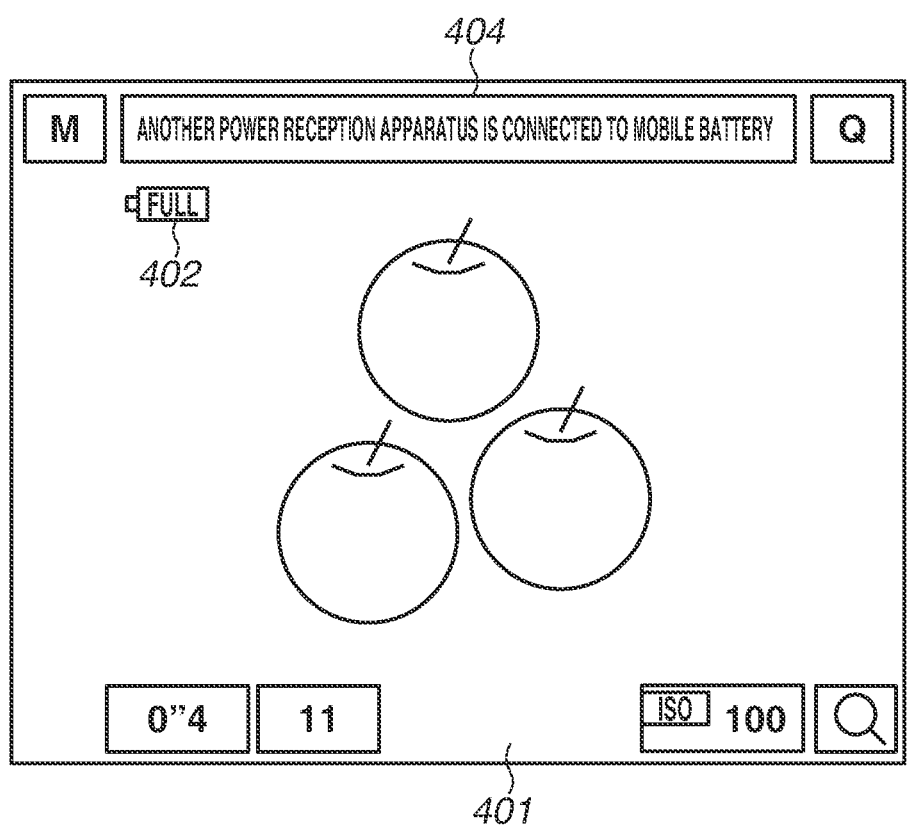

FIGS. 4A, 4B, and 4C are examples of display of a user notification according to the first exemplary embodiment. A display screen 401 is display of a live view image capturing state (the state where an object image captured by the image sensor 201 is displayed in real time) on the display unit 101. In a surrounding portion of the display screen 401, setting values regarding the capturing of an image are displayed in a superimposed manner.

An icon 402 an icon indicating the state of the battery 106. For example, the icon 402 can indicate the level of the remaining capacity of the battery 106 or the presence or absence of the charging of the battery 106. In the examples of FIGS. 4A, 4B, and 4C, the icon 402 indicates that the battery 106 is in a fully charged state.

An icon 403 and text 404 illustrate examples where the user is notified that the another power reception apparatus 115 is connected to the power transmission apparatus 111.

FIG. 4A is an example of display in a case where the power transmission apparatus 111 is connected to the imaging apparatus 100, and the another power reception apparatus 115 is not connected to the power transmission apparatus 111. FIGS. 4B and 4C are examples of display in a case where the power transmission apparatus 111 is connected to the imaging apparatus 100, and the another power reception apparatus 115 is connected to the power transmission apparatus 111. A notification may be given using an icon as in the icon 403 or using text as in the text 404. The content of the text 404 is merely an example. Alternatively, in a case where the power consumption of the operation of the imaging apparatus 100 and the power consumption of the power transmission apparatus 111 do not match each other, the text 404 may simply indicate that "there is a possibility that power supply cannot be maintained". Alternatively, a notification other than the above notification may be given. A configuration may be employed in which a notification is given not on the display unit 101, but using a sound, for example.

Figure 5:
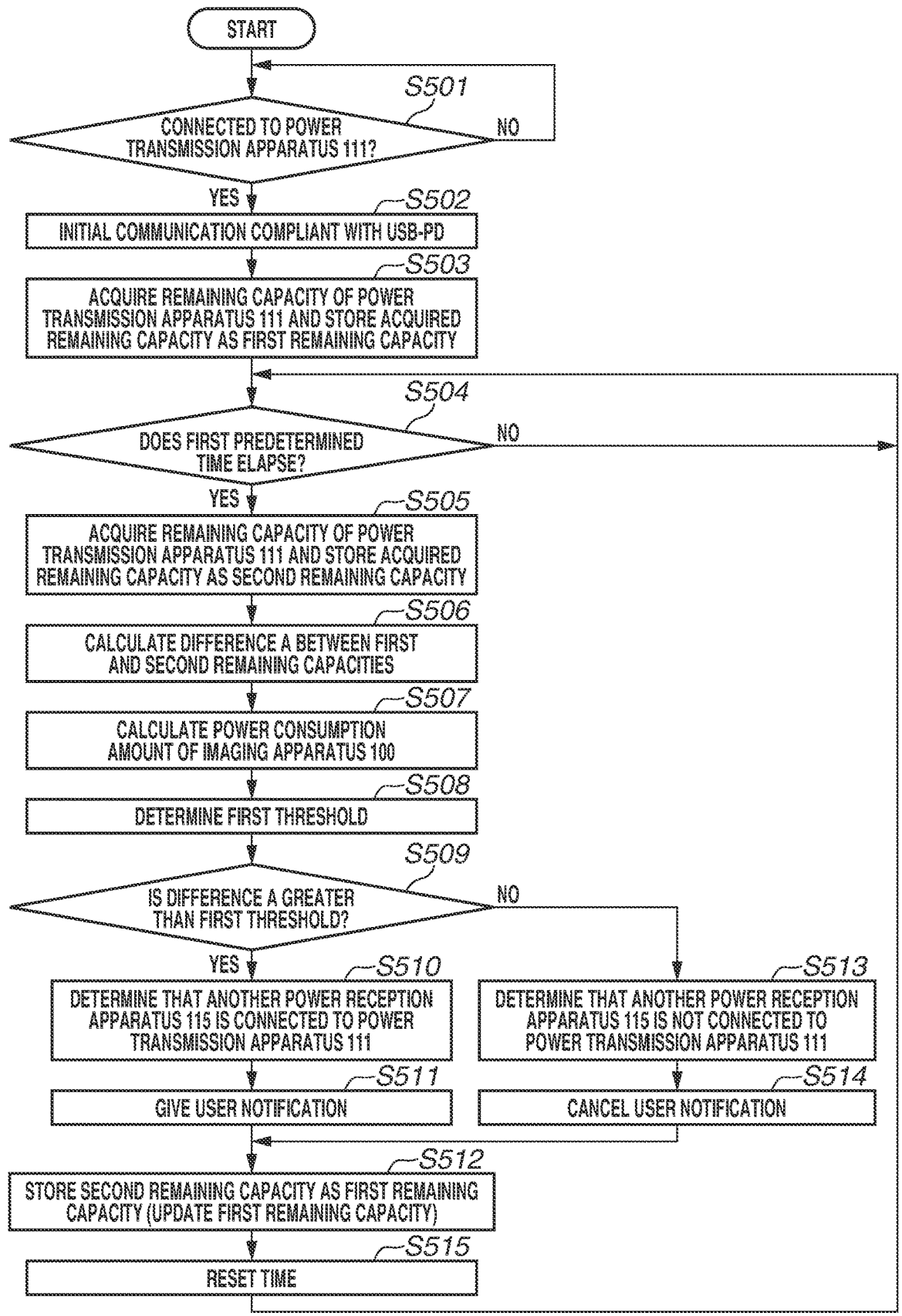
FIG. 5 is a flowchart in which a user is notified of information regarding an external power supply, according to the first exemplary embodiment.

FIG. 5 is a flowchart in which the user is notified of information regarding a change in the remaining capacity of the external power supply, according to the first exemplary embodiment. Processes in the flowchart in FIG. 5 are achieved by the system control unit 208 loading a program stored in the non-volatile memory 207 into the system memory 209, executing the program, and controlling the functional blocks. If the imaging apparatus 100 is started, the flowchart in FIG. 5 is started.

If the imaging apparatus 100 starts, then in step S501, it is determined whether the imaging apparatus 100 is connected to the power transmission apparatus 111. If the imaging apparatus 100 is connected to the power transmission apparatus 111 (YES in step S501), the processing proceeds to step S502. If the imaging apparatus 100 is not connected to the power transmission apparatus 111 (NO in step S501), step S501 is repeated.

In step S502, initial communication compliant with the USB-PD standard is performed.

In step S503, the remaining capacity of the power transmission apparatus 111 is acquired. For example, using PD communication based on USB-PD, information regarding a battery status message is acquired. The unit of the remaining capacity is Wh, for example, and the acquired remaining capacity is stored as a first remaining capacity.

In step S504, time is measured from step S503, and it is determined whether a first predetermined time elapses. The first predetermined time may have any value. For example, it is desirable that the first predetermined time should be time (about several minutes) during which a certain amount of power is considered to be consumed by the operation of the imaging apparatus 100. Further, the first predetermined time may be switched according to the operation mode as follows. In an operation mode where the power consumption is small (e.g., the reproduction mode), the first predetermined time is set to be long. In an operation mode where the power consumption is large (e.g., while a moving image is recorded), the first predetermined time is set to be short. In this case, for example, the first predetermined time is obtained as follows.

$$t_{total} = \frac{1}{60}[h] = 1[m] = 60[s] \qquad \text{formula (3)}$$

If the first predetermined time elapses (YES in step S504), the processing proceeds to step S505. If the first predetermined time does not elapse (NO in step S504), step S504 is repeated.

In step S505, similarly to step S503, the remaining capacity of the power transmission apparatus 111 at this timing is acquired. The acquired remaining capacity is stored as a second remaining capacity.

In step S506, a difference A between the first and second remaining capacities is calculated.

In step S507, the power consumption amount of the imaging apparatus 100 before and after the lapse of the first predetermined time is calculated. For example, if the operation of the imaging apparatus 100 until the lapse of the first predetermined time is
- the capturing of a moving image (FHD 60 p): 30 seconds
- the capturing of a still image (the back side monitor is used): 2 seconds
- waiting (the image capturing screen is displayed): 28 seconds the power consumption amount $Ph_{total}$ is obtained based on the table 301 and formulas (1) and (2) as follows.

$$Ph_{total} = \frac{1}{60[s]} \times \qquad \text{formula (4)}$$
$$(4000[mW] \times 30[s] + 30[mW] \times 2[s] + 2500[mW] \times 28[s]) \times$$
$$\frac{1}{60}[h] \approx 52.79[mWh] = 0.0527[Wh]$$

After the power consumption amount $Ph_{total}$ is calculated, the processing proceeds to step S508.

In step S508, based on the calculated power consumption amount $Ph_{total}$, a first threshold is determined based on the amount of power to be consumed by the imaging apparatus 100. For example, if the power consumption amount $Ph_{total}$ is 0.05279 mW, the first threshold is set to 0.053 mW. At this time, in expectation of some error in the difference in the power capacity of the external power supply, the first threshold is set to a value slightly greater than the power consumption of the operation of the imaging apparatus 100. If the first threshold is set to a greater value, the display is switched less frequently. If the first threshold is set to a value closer to the power consumption amount ($Ph_{total}$), a user notification is given every time even a small discrepancy occurs between the power consumption of the imaging apparatus 100 and a change in the capacity of the external power transmission apparatus 111.

In step S509, it is determined whether the difference A is greater than the first threshold. If the difference A is greater than the first threshold (YES in step S509), the processing proceeds to step S510. If the difference A is smaller than the first threshold (NO in step S509), the processing proceeds to step S513. For example, if the first remaining capacity is 100 mW, and the second remaining capacity is 99.9 mW, the difference A is obtained as follows.

$$\text{difference } A = 100 - 99.9 = 0.1[Wh] > 0.053[Wh] \qquad \text{formula (5)}$$

Then, the processing proceeds to step S510. In step S510, it is determined that the another power reception apparatus 115 is connected to the power transmission apparatus 111.

Next, in step S511, the user is notified that the another power reception apparatus 115 is connected to the power transmission apparatus 111. The notification is, for example, display as in the icon 403 or the text 404 in FIGS. 4A, 4B, and 4C.

If, on the other hand, the first remaining capacity is 100 mW, and the second remaining capacity is 99.95 mW, the difference A is obtained as follows.

$$\text{difference } A = 100 - 99.95 = 0.05[Wh] < 0.053[Wh] \qquad \text{formula (6)}$$

Then, the processing proceeds to step S513. In step S513, it is determined that the another power reception apparatus 115 is not connected to the power transmission apparatus 111.

Next, in step S514, a user notification that the another power reception apparatus 115 is connected to the power transmission apparatus 111 is cancelled. If no user notification is given before the processing proceeds to step S514, the state where no user notification is given is maintained.

In step S512, the second remaining capacity is updated as a new first remaining capacity, and the processing proceeds to step S515. In step S515, time is reset. Then, the measurement of time is started again, and the processing returns to step S504.

As described above, according to the first exemplary embodiment, it is possible to compare the amount of power to be used by the imaging apparatus 100 and a change in the remaining capacity of the external power source acquired via a USB cable, and suggest to the user a change in the condition under which an apparatus can be used. Alternatively, a configuration may be employed in which the user is not notified that another power reception apparatus is connected to the external power supply, but it is only detected that there is a discrepancy between the amount of change in the remaining capacity of the external power supply and the power consumption amount, and the user is notified of the detection result.

With reference to FIGS. 6A, 6B, 6C, 6D, 6E, 6F, and 7, a description is given below of an example where based on a change in the remaining capacity of the power source externally connected to the imaging apparatus 100 and the power consumption amount of another power reception apparatus, the user is notified of operation information regarding an operation executable by the imaging apparatus 100, according to a second exemplary embodiment.

FIGS. 6A, 6B, 6C, 6D, 6E, and 6F are examples of display of a user notification according to the second exemplary embodiment. Components similar to those in FIGS. 4A, 4B, and 4C are designated by the same signs, and are not described here.

Figure 6A:
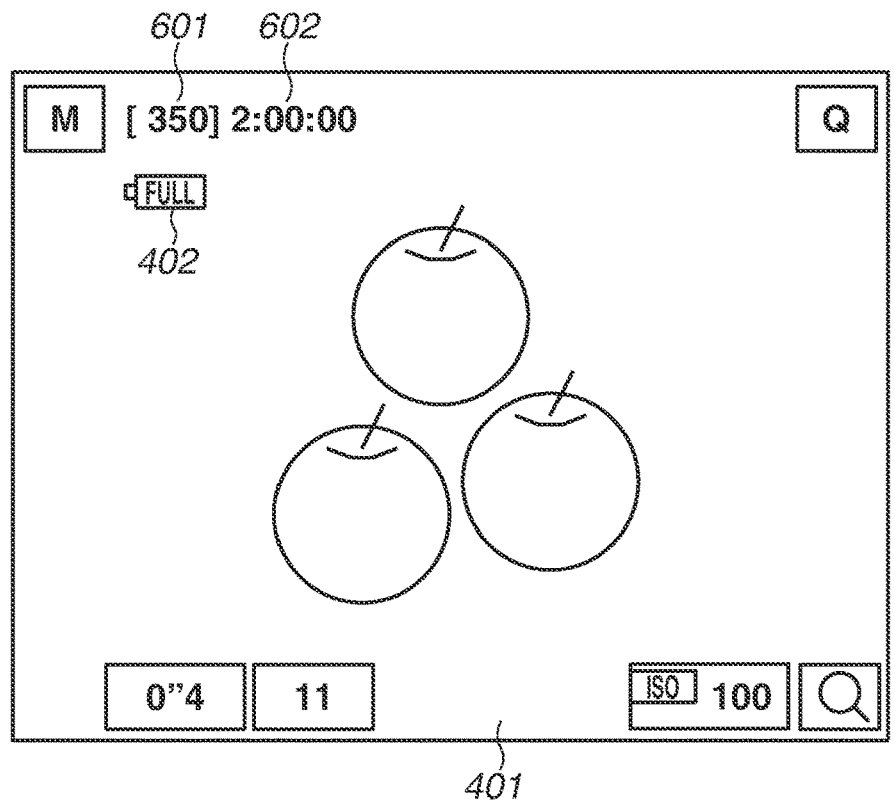
FIGS. 6A, 6B, 6C, 6D, 6E, and 6F are examples of display of a user notification according to a second exemplary embodiment.
Figure 6B:
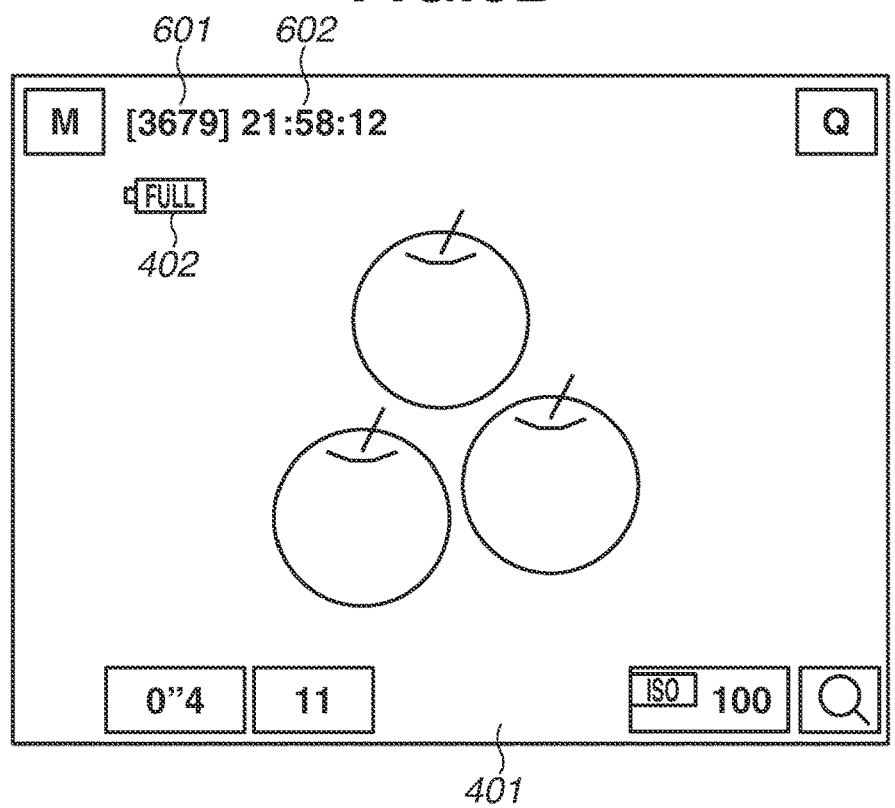
Figure 6C:
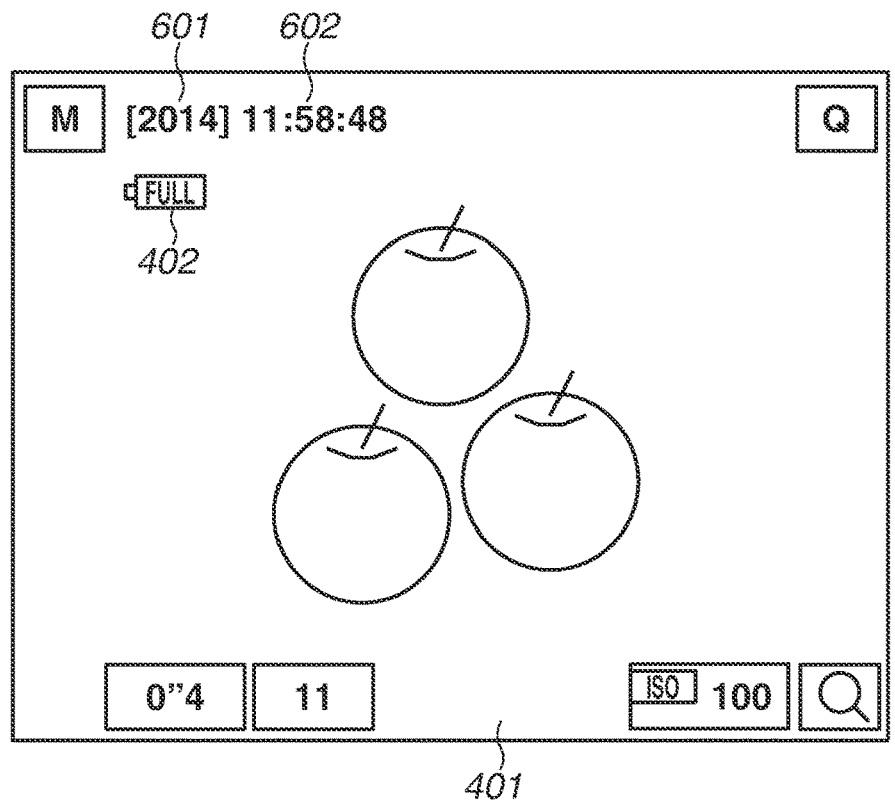

FIGS. 6A to 6C illustrate examples of a case where the remaining capacity of the battery 106 is in a full state. A numerical value 601 indicates the number of still images that can be captured by the imaging apparatus 100. A numerical value 602 indicates the recording time during which a moving image can be captured by the imaging apparatus 100. Specific examples of the calculations will be described in detail below with reference to FIG. 7.

FIG. 6A is an example of display in a case where the imaging apparatus 100 is not connected to the power transmission apparatus 111. The display is performed according to the remaining capacity of the battery 106. For example, the numerical values 601 and 602 indicate the value of the number of still images that can be captured as 350 images, and the value of the time during which a moving image can be captured as two hours, respectively.

FIG. 6B is an example of display in a case where the remaining amount of the battery 106 of the imaging apparatus 100 is in a full state, and the imaging apparatus 100 is connected to the power transmission apparatus 111. At this time, the another power reception apparatus 115 other than the imaging apparatus 100 is not connected to the power transmission apparatus 111. Thus, the number of images that can be recorded and the time during which a moving image can be captured are displayed based on the remaining capacity of the battery 106 and the remaining capacity of the power transmission apparatus 111. For example, in FIG. 6B, the numerical values 601 and 602 indicate the number of still images that can be captured as 3679 images, and the time during which a moving image can be captured as 21 hours 58 minutes 12 seconds, respectively.

FIG. 6C is an example of display in a case where the remaining amount of the battery 106 is in a full state, the imaging apparatus 100 is connected to the power transmission apparatus 111, and the power transmission apparatus 111 is also connected to the another power reception apparatus 115. The display is performed according to the remaining capacity of the battery 106 and the remaining capacity of the power transmission apparatus 111. Considering power that can be used in the remaining capacity of the battery 106 and the power of the power transmission apparatus 111, the number of images that can be captured and the time during which a moving image can be captured are displayed. For example, in the example of FIG. 6C, the numerical values 601 and 602 indicate the number of still images that can be captured as 2014 images, and the time during which a moving image can be captured as 11 hours 58 minutes 48 seconds, respectively.

Figure 6D:
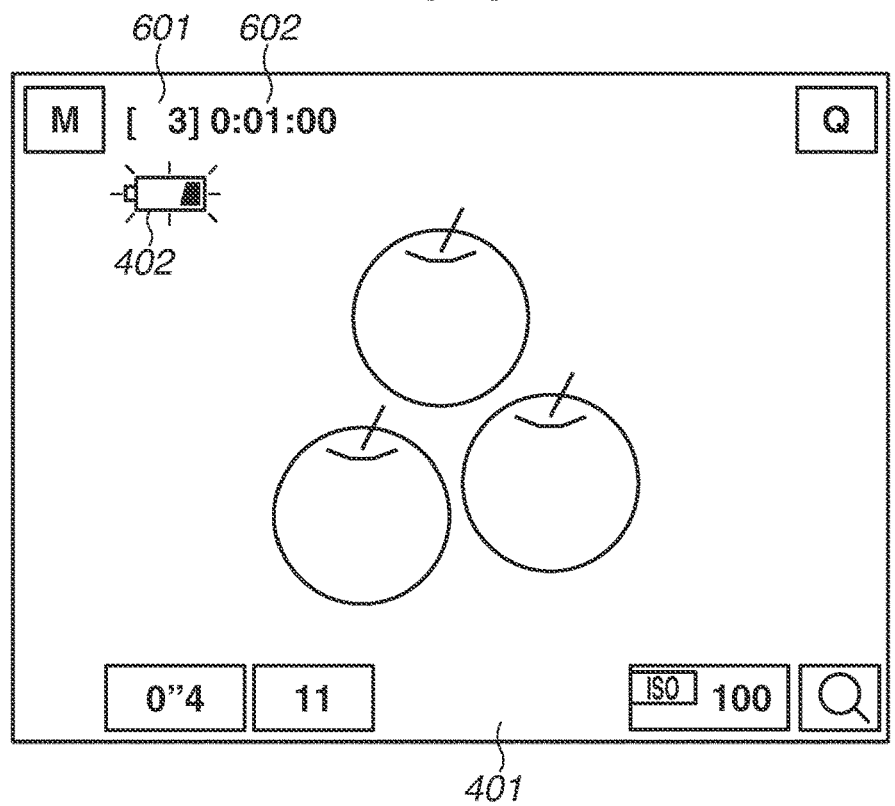
Figure 6E:
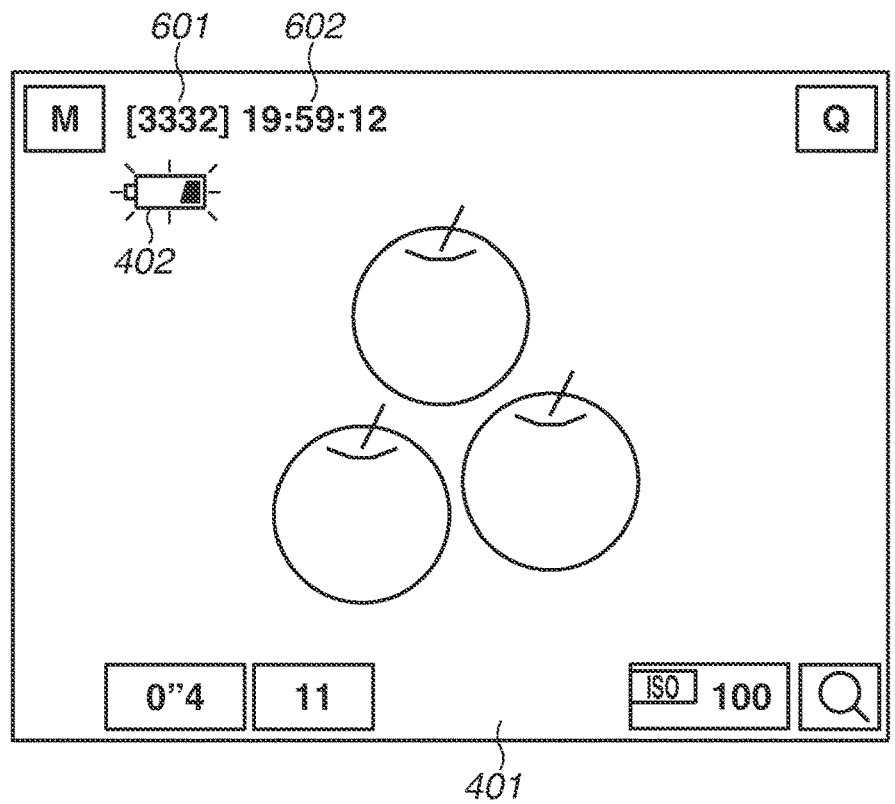
Figure 6F:
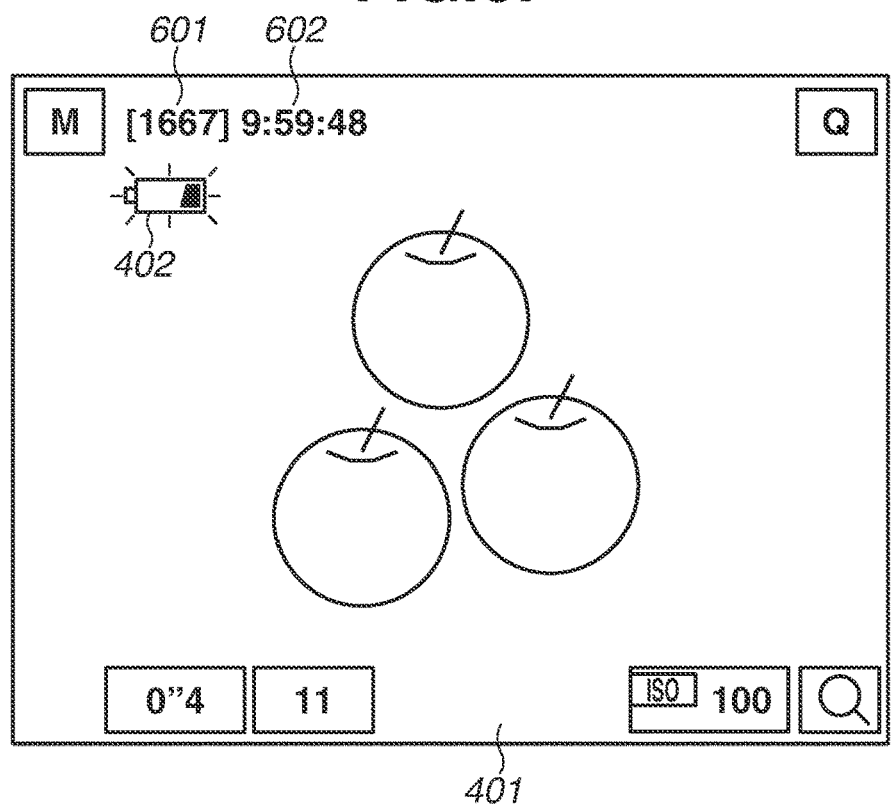

FIGS. 6D to 6F illustrate examples of a case where the remaining capacity of the battery 106 is almost zero, i.e., is in the state where the battery 106 cannot be used unless the battery 106 is charged (a low-battery state), and the battery 106 is not charged.

FIG. 6D is an example of display in a case where the imaging apparatus 100 is not connected to the power transmission apparatus 111. In this case, the battery 106 is in a low-battery state, and the display is performed according to this state. For example, the numerical values 601 and 602 indicate the number of still images that can be captured as three images, and the time during which a moving image can be captured as one minute, respectively.

FIG. 6E is an example of display in a case where the battery 106 is in a low-battery state, and the imaging apparatus 100 is connected to the power transmission apparatus 111. At this time, the another power reception apparatus 115 other than the imaging apparatus 100 is not connected to the power transmission apparatus 111. Thus, the display is performed according to the remaining capacity of the battery 106 and the remaining capacity of the power transmission apparatus 111. For example, the numerical values 601 and 602 indicate the number of still images that can be captured as 3232 images, and the time during which a moving image can be captured as 19 hours 59 minutes 12 seconds, respectively.

FIG. 6F is an example of display in a case where the battery 106 is in a low-battery state, the imaging apparatus 100 is connected to the power transmission apparatus 111, and the another power reception apparatus 115 is connected to the power transmission apparatus 111. The display is performed according to the amount of power that can be used by the imaging apparatus 100 in the remaining capacity of the battery 106 and the remaining capacity of the power transmission apparatus 111. For example, the numerical values 601 and 602 indicate the number of still images that can be captured as 1667 images, and the time during which a moving image can be captured as 9 hours 59 minutes 48 seconds, respectively.

In FIGS. 6A to 6F, examples have been described where the remaining capacity of the battery 106 is in a full state or a low-battery state. If, however, the remaining capacity has a predetermined amount, calculations may be made according to the remaining capacity. If the battery 106 has a remaining capacity, the numerical values 601 and 602 are displayed taking into account the remaining capacity. Alternatively, the remaining capacity may not be taken into account. Particularly in the state where the battery 106 is being charged, it may be easier to understand this state without taking into account the remaining capacity.

Figure 7:
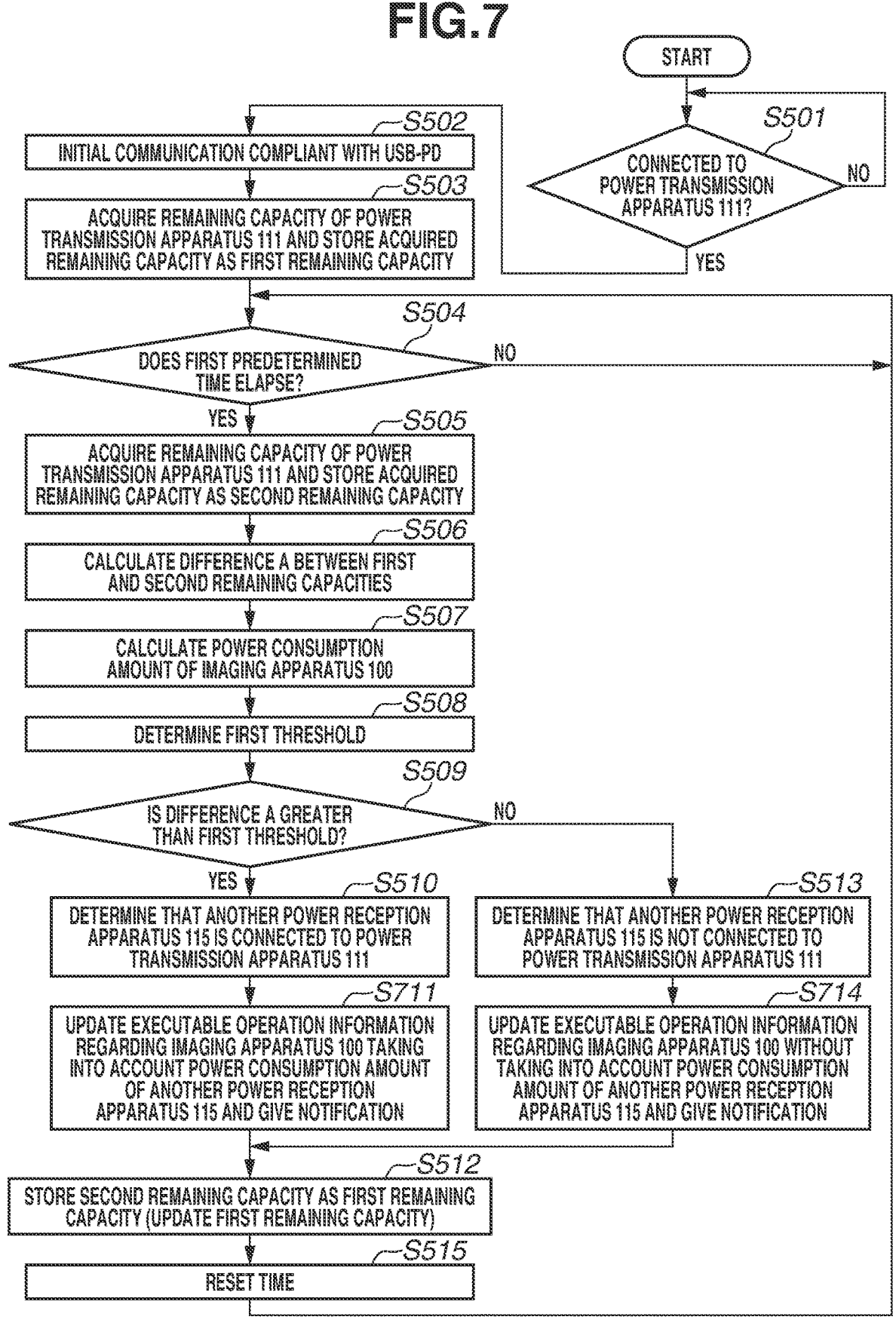
FIG. 7 is a flowchart of a user notification based on information regarding a change in a remaining capacity of an external power supply, according to the second exemplary embodiment.

FIG. 7 is a flowchart in which the user is notified of information based on a change in the remaining capacity of the external power supply, according to the second exemplary embodiment. Processes in this flowchart are achieved by the system control unit 208 loading a program stored in the non-volatile memory 207 into the system memory 209, executing the program, and controlling the functional blocks of the imaging apparatus 100. Steps similar to those in the flowchart in FIG. 5 are designated by the same signs, and are not described here. In this flowchart, in addition to the control in FIG. 5, when the user is notified of information regarding the external power supply, the user is notified of information regarding an operation executable by the imaging apparatus 100.

If the imaging apparatus 100 is started, this flowchart is started. After the imaging apparatus 100 starts, then in steps S501 to S510, processes similar to those in the flowchart in FIG. 5 are executed. If it is determined in step S510 that the another power reception apparatus 115 is connected to the power transmission apparatus 111, the processing proceeds to step S711.

In step S711, executable operation information regarding the imaging apparatus 100 is updated taking into account the power consumption amount of the another power reception apparatus 115, and the user is notified of the updated executable operation information. For example, if the first remaining capacity is 100 Wh, and the second remaining capacity is 99.894 Wh, the difference A is obtained as follows.

$$\text{difference } A = 100 - 99.894 = 0.106 [\text{Wh}] \quad \text{formula (7)}$$

If the power consumption amount $Ph_{total}$ of the imaging apparatus 100 is 0.053 Wh, the power consumption amount $Ph_{total\_other}$ of the another power reception apparatus 115 is obtained as follows.

$$Ph_{total\_other} = \quad \text{formula (8)}$$
$$\text{difference } A - Ph_{total} = 0.106 - 0.053 = 0.053 [\text{Wh}]$$

At this time, the remaining capacity of the power transmission apparatus 111 that can be used by the imaging apparatus 100 is obtained as follows.

$$\text{second remaining capacity} \times \frac{Ph_{total}}{\text{difference } A} = \quad \text{formula (9)}$$
$$99.894 \times \frac{0.053}{0.106} = 49.947 [\text{Wh}]$$

Based on the table 301, the number of still images that can be captured (the back side monitor is used) is obtained as follows.

$$\frac{49.947[\text{Wh}]}{30[\text{mW}] \times 1[\text{h}]} \times 1000 = 1664.9 \approx 1664 \text{ [images]} \quad \text{formula (10)}$$

Further, based on the table 301, the time during which a moving image can be captured (4K 30 p) is obtained as follows.

$$\frac{49.947[\text{Wh}]}{5000[\text{mW}]} \times 1000 = 9.9894 \approx 9.98[\text{h}] = 9[\text{h}]58[m]48[\text{s}] \quad \text{formula (11)}$$

If the remaining capacity of the battery 106 is taken into account, the number of images that can be captured and the time during which an image can be recorded according to the remaining capacity of the battery 106 are added, and the notification is given as in the display in FIG. 6C. If the remaining capacity of the battery 106 is not taken into account, or if the battery 106 does not have a remaining amount, the notification is given as in the display in FIG. 6F. After the notification is given, the processing proceeds to step S512. In step S512, similarly to the above process, the second remaining capacity is updated as the first remaining capacity. The remaining capacity of the power transmission apparatus 111 that can be used by the imaging apparatus 100 is calculated based on the proportion of the power consumption amount $Ph_{total}$ to the difference A, but may be calculated using another method.

If the difference A is less than the first threshold in step S509, i.e., if it is determined in step S513 that the power transmission apparatus 111 is not connected to the another power reception apparatus 115 in the present exemplary embodiment, the processing proceeds to step S714. In step S714, the executable operation information regarding the imaging apparatus 100 is updated without taking into account the power consumption amount of the another power reception apparatus 115, and the user is notified of the updated executable operation information. For example, if the second remaining capacity is 99.894 Wh, all the second remaining capacity can be used by the imaging apparatus 100. Thus, based on the table 301, the number of still images that can be captured (the back side monitor is used) is obtained as follows.

$$\frac{99.894[\text{Wh}]}{30[\text{mW}] \times 1[\text{h}]} \times 1000 = 3329.8 \approx 3329 \text{ [images]} \quad \text{formula (12)}$$

Further, based on the table 301, the time during which a moving image can be captured (4K 30 p) is obtained as follows.

$$\frac{99.894[\text{Wh}]}{5000[\text{mW}]} \times 1000 = 19.9788 \approx 19.97[\text{h}] = 19[\text{h}]58[m]12[\text{s}] \quad \text{formula (13)}$$

If the remaining capacity of the battery 106 is taken into account, the number of images that can be captured and the time during which an image can be recorded according to the remaining capacity of the battery 106 are added, and the notification is given as in the display in FIG. 6B. If the remaining capacity of the battery 106 is not taken into account, or if the remaining capacity of the battery 106 is in a low-battery state, the notification is given as in the display in FIG. 6E. After the notification is given, the processing proceeds to step S512.

As described above, according to the second exemplary embodiment, a user notification is controlled taking into account also the power consumption amount of another power reception apparatus connected to a power transmission apparatus, whereby it is possible to suggest to the user a detailed change in the condition under which an apparatus can be used. It is possible to update the user notification according to a change in the remaining capacity of a power source.

With reference to FIGS. 8A, 8B, 8C, 8D, and 9, a description will be given below of an example where a user notification is controlled based on whether the external power source is connected to an alternating current (AC) power supply, according to a third exemplary embodiment.

FIGS. 8A, 8B, 8C, and 8D are examples of display of a user notification according to the third exemplary embodiment. Components similar to those in FIGS. 4A, 4B, and 4C and FIGS. 6A, 6B, 6C, 6D, 6E, and 6F are designated by the same signs, and are not described here.

A numerical value 801 indicates the number of still images that can be captured by the imaging apparatus 100 in a case where the imaging apparatus 100 is connected to the power transmission apparatus 111, and the power transmission apparatus 111 is connected to an AC power supply. A numerical value 802 indicates the recording time during which a moving image can be captured by the imaging apparatus 100 in a case where the imaging apparatus 100 is connected to the power transmission apparatus 111, and the AC power supply is connected to the power transmission apparatus 111.

Figure 8A:
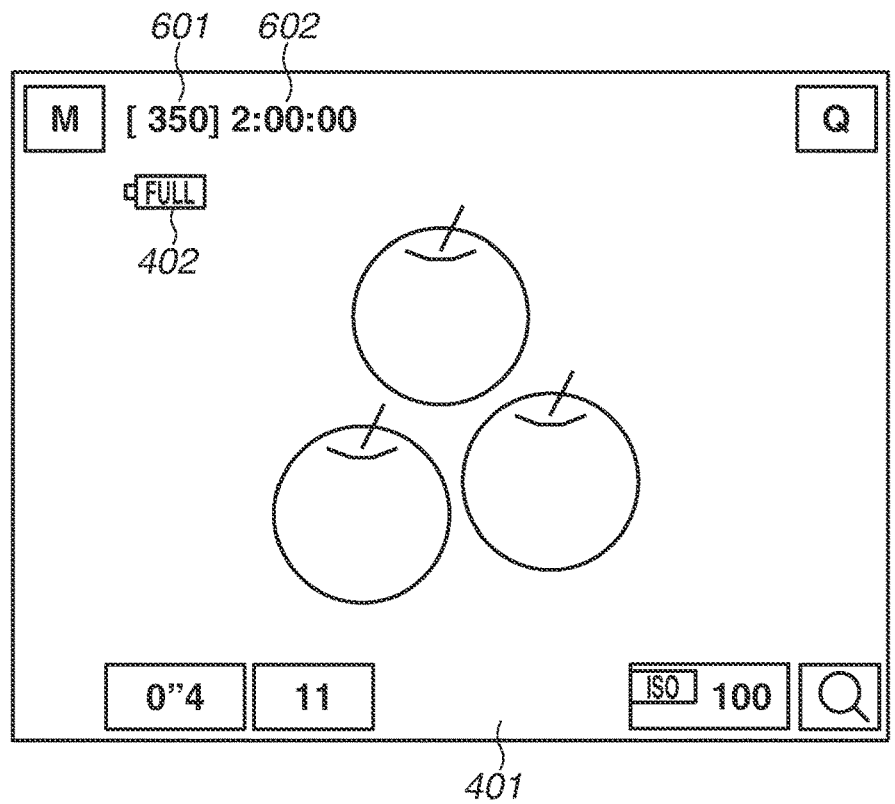
FIGS. 8A, 8B, 8C, and 8D are examples of display of a user notification according to a third exemplary embodiment.
Figure 8B:
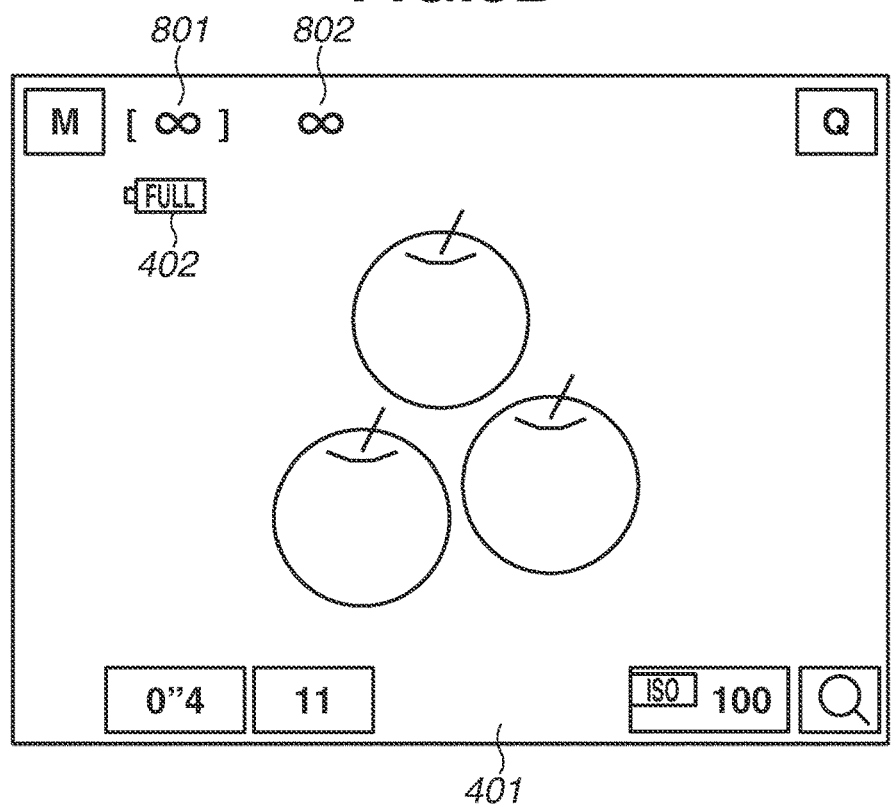
Figure 8C:
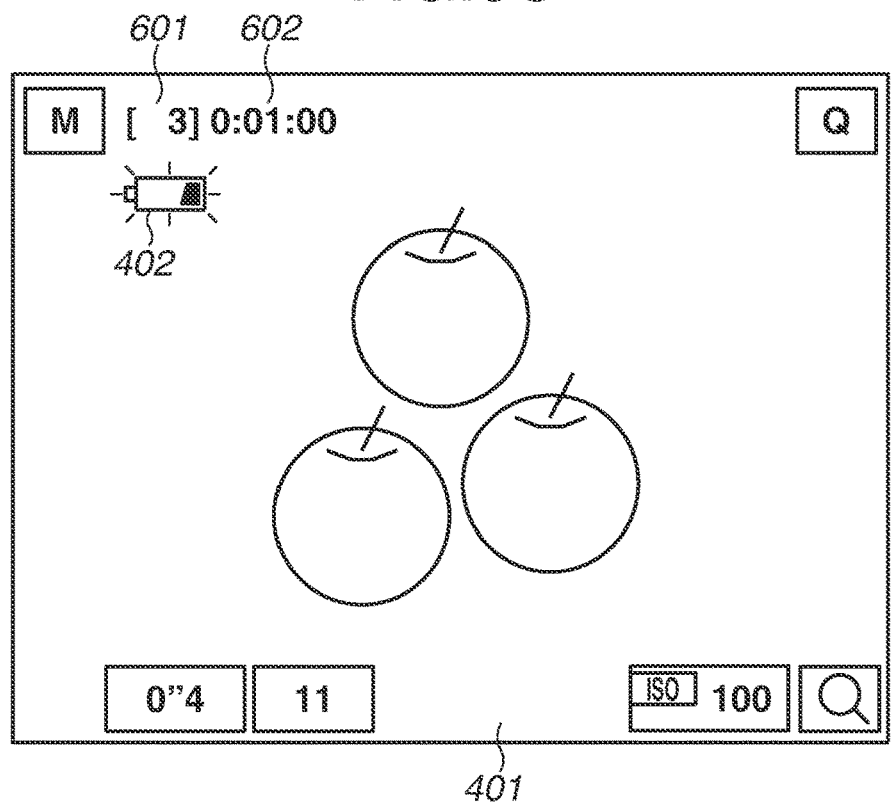
Figure 8D:
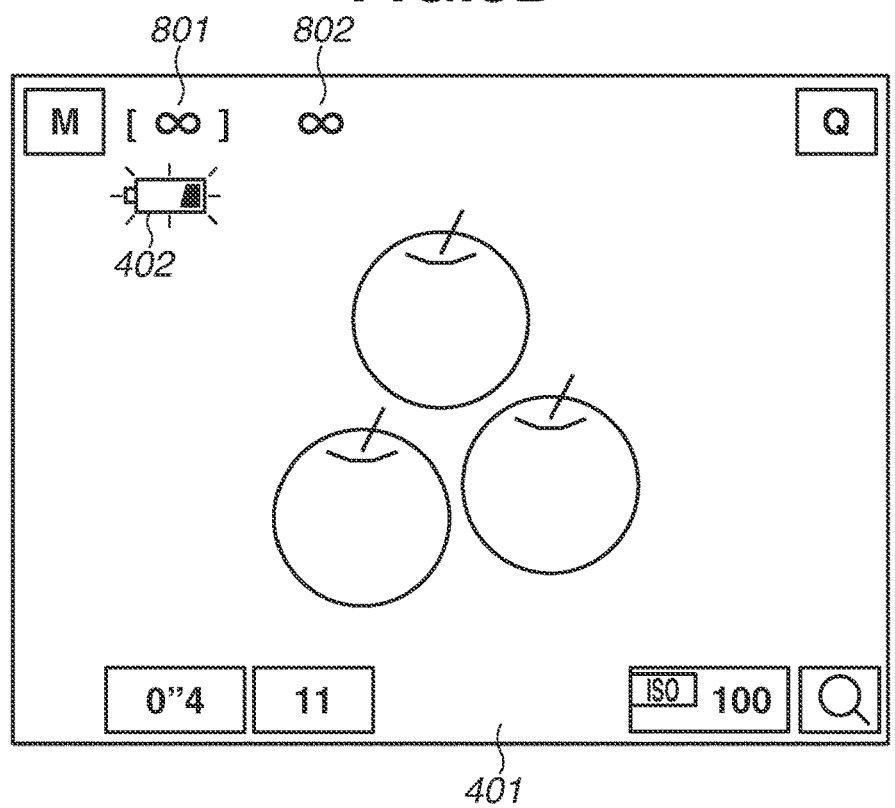

FIGS. 8A and 8B are examples of a state where the remaining capacity of the battery 106 is in a full state. FIGS. 8C and 8D are examples of a state where the battery 106 is in a low-battery state and is not charged. When the remaining capacity of the battery 106 is in a full state, the number of still images that can be captured is 350 images, and the time during which a moving image can be captured is two hours. Further, when the battery 106 is in a low-battery state, the number of still images that can be captured is three images, and the time during which a moving image can be captured is one minute.

FIGS. 8A and 8C are similar to FIGS. 6A and 6D, and therefore are not described here.

FIG. 8B is an example of display in a case where the battery 106 is in a fully charged state, the imaging apparatus 100 is connected to the power transmission apparatus 111, and the AC power supply is connected to the power transmission apparatus 111. Since the AC power supply is connected to the power transmission apparatus 111, "∞" is displayed. This display is intended to indicate that images can be infinitely captured in terms of power supply.

FIG. 8D is an example of display in a case where the battery 106 is in a low-battery state, the imaging apparatus 100 is connected to the power transmission apparatus 111, and the AC power supply is connected to the power transmission apparatus 111. Since the AC power supply is connected to the power transmission apparatus 111, "∞" is displayed. This display is intended to indicate that images can be infinitely captured in terms of power supply.

In FIGS. 8B and 8D, a sign indicating the state where the power transmission apparatus 111 is connected to the AC power supply may be display other than "∞", and may be display according to the capacity of the external attachable/detachable memory 206.

Figure 9B:
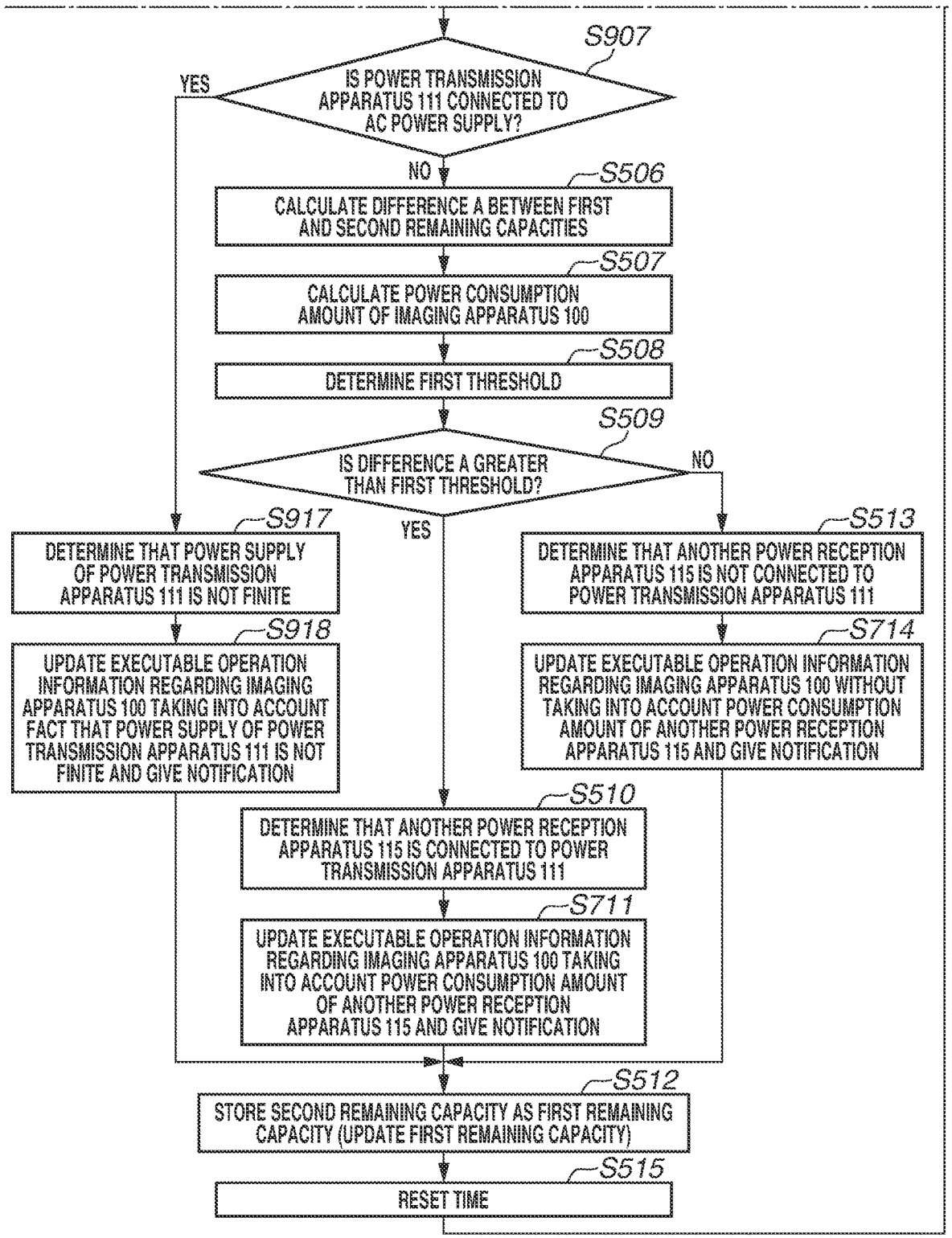

FIGS. 9A and 9B are a flowchart in which the user is notified of information regarding the power source, according to the third exemplary embodiment. Processes in the flowchart in FIGS. 9A and 9B are achieved by the system control unit 208 loading a program stored in the non-volatile memory 207 into the system memory 209, executing the program, and controlling the functional blocks of the imaging apparatus 100. Steps similar to those in the flowcharts in FIGS. 5 and 7 are designated by the same signs, and are not described here. In this flowchart, in addition to the control in FIG. 7, it is determined whether the external power supply is connected to the AC power supply, and the content of a user notification is changed according to the determination result.

If the imaging apparatus 100 starts, this flowchart is started. After the imaging apparatus 100 starts, then in steps S501 to S505, processes similar to those in the flowchart in FIG. 5 are executed, and the processing proceeds to step S906. In step S906, information regarding the connection between the power transmission apparatus 111 and the AC power supply is acquired. In the present exemplary embodiment, the information can be acquired through PD communication based on the USB-PD standard.

Next, in step S907, based on the information acquired in step S906, it is determined whether the power transmission apparatus 111 is connected to the AC power supply. If the power transmission apparatus 111 is not connected to the AC power supply (NO in step S907), the processing proceeds to step S506. Then, processes similar to those of step S506 and after that in FIG. 7 are executed. If it is determined that the power transmission apparatus 111 is connected to the AC power supply (YES in step S907), the processing proceeds to step S917.

If the processing proceeds to step S917, it is determined that the power supply of the power transmission apparatus 111 is not finite.

Next, in step S918, executable operation information regarding the imaging apparatus 100 is updated taking into account the fact that the power supply of the power transmission apparatus 111 is not finite, and the user is notified of the updated executable operation information. For example, the notification is given as in the display in FIG. 8B or 8D. After the notification is given, the processing proceeds to step S512. In step S512, similarly to the processes in FIGS. 5 and 7, the record is updated such that the second remaining capacity is the first remaining capacity.

According to the third exemplary embodiment, a notification is given based on whether an external power source is connected to an AC power supply, whereby it is possible to suggest to the user a more subtle change in the condition under which an apparatus can be used.

While the exemplary embodiments of the present disclosure have been described above, the present disclosure is not limited to the above exemplary embodiments in the scope of the technical idea of the present disclosure, and should be appropriately changed and adapted depending on the target circuit form. For example, the camera described as the imaging apparatus in the above exemplary embodiments can be applied to a digital still camera and a digital video camera.

In the above exemplary embodiments, power is received according to the USB-PD standard with respect to a connection interface between the imaging apparatus 100 and the power transmission apparatus. The present disclosure, however, is not limited to this. For example, a form may be employed in which power is received using another connection interface so long as communication is performed through which power can be received and supplied, and the remaining power holding capacity on the power supply side or the amount of change in the remaining power holding capacity on the power supply side can be acquired.

Further, the present disclosure can also be achieved in exemplary embodiments as, for example, a system, an apparatus, a method, a computer program, and a recording medium. Specifically, the present disclosure may be achieved by a single apparatus, or may be applied to a system composed of a plurality of apparatuses. Units included in the imaging apparatus according to the present exemplary embodiments and the steps of a method for controlling an imaging apparatus according to the present exemplary embodiments can also be achieved by the operation of a program stored in a memory of a computer. This computer program and a computer-readable recording medium that records this program are included in the present disclosure.

The present disclosure can also be achieved by the process of supplying a program for achieving one or more functions of the above exemplary embodiments to a system or an apparatus via a network or a storage medium, and of causing one or more processors of a computer of the system or the apparatus to read and execute the program. Further, the present disclosure can also be achieved by a circuit (e.g., an application-specific integrated circuit (ASIC)) for achieving the one or more functions.

According to the present disclosure, when an electronic apparatus operates using an external power supply such as a mobile battery, it is possible to give a user notification based on the actual power consumption of the electronic apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-191738, filed Oct. 10, 2018, which is hereby incorporated by reference herein in its entirety.

What is claimed is:

1. An electronic apparatus comprising:
   a CPU;
   a memory storing a program which, when executed by the CPU, causes the electronic apparatus to function as:
   a power reception unit configured to receive power supplied from an external power source;
   a communication unit configured to receive information regarding a remaining capacity of the external power source from the external power source;
   an acquisition unit configured to acquire, from the received information, an amount of change in the remaining capacity of the external power source in a predetermined period; and
   a notification unit configured to discriminate whether the amount of change in the remaining capacity of the external power source in the predetermined period acquired by the acquisition unit is greater than a first threshold corresponding to a power consumption amount of the electronic apparatus in the predetermined period or not and perform a process for displaying information for a notification to a user in accordance with a result of the discrimination,
   wherein the notification unit performs the process for displaying such that predetermined information for notifying to the user that a consumption amount of the external power source is greater than the power consumption amount of the electronic apparatus is displayed if it is discriminated that the amount of change in the remaining capacity of the external power source in the predetermined period is greater than the first threshold, and performs the process for displaying such that the predetermined information is not displayed if it is discriminated that the amount of change in the remaining capacity of the external power source in the predetermined period is not greater than the first threshold.

2. The electronic apparatus according to claim 1, wherein the electronic apparatus connects to the external power source via a connector compatible with a Universal Serial Bus Type-C standard.

3. The electronic apparatus according to claim 2, wherein the communication unit receives information regarding the external power source using communication compatible with a Universal Serial Bus Power Delivery standard.

4. The electronic apparatus according to claim 1, wherein the first threshold is a value greater than or equal to the power consumption amount of the electronic apparatus in the predetermined period.

5. The electronic apparatus according to claim 1, wherein the predetermined period is variable according to an operation mode of the electronic apparatus.

6. The electronic apparatus according to claim 1, wherein the program, when executed by the CPU, further causes the electronic apparatus to function as a calculation unit configured to, based on the amount of change in the remaining capacity of the external power source in the predetermined period, calculate information regarding an operation executable by the electronic apparatus,
   wherein the notification unit notifies the user of the operation information calculated by the calculation unit.

7. The electronic apparatus according to claim 6, wherein based on a proportion of the power consumption amount of the electronic apparatus to the amount of change in the remaining capacity of the external power source in the predetermined period, the calculation unit calculates the operation information.

8. The electronic apparatus according to claim 6, wherein the program, when executed by the CPU, further causes the electronic apparatus to perform a process for capturing,
   wherein the operation information includes information regarding at least one of a number of still images that can be captured by the electronic apparatus and an image capturing time of a moving image.

9. The electronic apparatus according to claim 6, wherein further based on a remaining capacity of a battery included within the electronic apparatus, the calculation unit calculates information regarding an operation executable by the electronic apparatus.

10. The electronic apparatus according to claim 1,
    wherein the communication unit receives information regarding whether a capacity of the external power source is finite, and
    wherein if it is determined that the capacity of the power source is not finite, the notification unit performs the process for displaying such that the predetermined information is not displayed.

11. A method of controlling an electronic apparatus which receives supplied from an external power source, the method comprising:
    receiving information regarding a remaining capacity of the external power source from the external power source;
    acquiring, from the received information, an amount of change in the remaining capacity of the external power source in a predetermined period;
    discriminating whether the amount of change in the remaining capacity of the external power source in the predetermined period acquired by the acquiring is greater than a first threshold corresponding to a power consumption amount of the electronic apparatus in the predetermined period or not; and
    performing a process for displaying information for a notification to a user in accordance with a result of the discrimination,
    wherein the performing performs the process for displaying such that predetermined information for notifying to the user that a consumption amount of the external power source is greater than the power consumption amount of the electronic apparatus is displayed if it is discriminated that the amount of change in the remaining capacity of the external power source in the predetermined period is greater than the first threshold, and performs the process for displaying such that the predetermined information is not displayed if it is discriminated that the amount of change in the remaining capacity of the external power source in the predetermined period is not greater than the first threshold.

12. The method for c according to claim 11, wherein the electronic apparatus connects to the external power source via a connector compatible with a Universal Serial Bus Type-C standard.

13. The method for according to claim 12, wherein information regarding the external power source is received using communication compatible with a Universal Serial Bus Power Delivery standard.

* * * * *